United States Patent
Hyde et al.

(10) Patent No.: US 9,548,507 B2
(45) Date of Patent: Jan. 17, 2017

(54) SYSTEMS AND METHODS FOR HYDROGEN FUEL STORAGE AND HYDROGEN POWERED VEHICLES

(71) Applicant: Elwha LLC, Bellevue, WA (US)

(72) Inventors: Roderick A. Hyde, Redmond, WA (US); Jordin T. Kare, Seattle, WA (US); Thomas J. Nugent, Jr., Bellevue, WA (US); Clarence T. Tegreene, Mercer Island, WA (US); David B. Tuckerman, Lafayette, CA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 639 days.

(21) Appl. No.: 14/012,870

(22) Filed: Aug. 28, 2013

(65) Prior Publication Data

US 2015/0064585 A1    Mar. 5, 2015

(51) Int. Cl.
| | |
|---|---|
| H01M 8/06 | (2016.01) |
| F02M 21/02 | (2006.01) |
| F17C 11/00 | (2006.01) |
| C01B 3/00 | (2006.01) |
| H01M 8/04 | (2016.01) |

(52) U.S. Cl.
CPC ............ *H01M 8/065* (2013.01); *C01B 3/0026* (2013.01); *F02M 21/0206* (2013.01); *F02M 21/0221* (2013.01); *F17C 11/005* (2013.01); *H01M 8/04208* (2013.01); *H01M 8/04216* (2013.01); *Y02E 60/321* (2013.01); *Y02E 60/327* (2013.01); *Y02E 60/50* (2013.01); *Y02T 10/32* (2013.01)

(58) Field of Classification Search
None
See application file for complete search history.

(56) References Cited

U.S. PATENT DOCUMENTS

| | | |
|---|---|---|
| 3,336,162 A | 8/1967 | Zachmann |
| 4,809,771 A | 3/1989 | Kennel et al. |
| 5,323,843 A | 6/1994 | Olszewski et al. |
| 6,106,801 A | 8/2000 | Bogdanovic et al. |
| 6,511,478 B1 | 1/2003 | Burnside et al. |
| 6,666,034 B1 | 12/2003 | Guan et al. |

(Continued)

FOREIGN PATENT DOCUMENTS

| | | |
|---|---|---|
| JP | 2005-282828 A | 10/2005 |
| JP | 2007-170604 A | 7/2007 |
| JP | 2008-075697 A | 4/2008 |

OTHER PUBLICATIONS

PCT International Search Report; International App. No. PCT/US2014/052873; Jan. 28, 2015; pp. 1-5.

(Continued)

*Primary Examiner* — Tracy Dove
(74) *Attorney, Agent, or Firm* — Foley & Lardner LLP (57) ABSTRACT

A storage system for storing hydrogen and providing controlled release of hydrogen gas includes a container having an outer wall defining an interior. The interior is configured to contain liquid lithium hydride, and a portion of the outer wall includes a thermally insulating layer. The storage system also includes a temperature control system configured to maintain the interior at a temperature such that the lithium hydride decomposes to produce hydrogen gas at a substantially equilibrium state.

35 Claims, 7 Drawing Sheets

(56) References Cited

U.S. PATENT DOCUMENTS

| | | | |
|---|---|---|---|
| 7,270,295 B2 | 9/2007 | Bennett | |
| 2004/0142291 A1* | 7/2004 | Yang | F23C 13/00 431/7 |
| 2010/0219086 A1* | 9/2010 | Chabak | C01B 3/0005 206/0.7 |
| 2010/0278722 A1* | 11/2010 | Field | C01B 3/0005 423/648.1 |
| 2010/0326992 A1 | 12/2010 | De Rango et al. | |
| 2011/0020215 A1* | 1/2011 | Ryu | C01B 3/065 423/658.2 |

OTHER PUBLICATIONS

Technology, from Safe Hydrogen (http://www.safehydrogen.com/technology.html), retreived on Sep. 11, 2013, 3 pages.

\* cited by examiner

SYSTEMS AND METHODS FOR HYDROGEN FUEL STORAGE AND HYDROGEN POWERED VEHICLES

BACKGROUND

Vehicles such as cars, aircraft, etc. often use petroleum-based fuels to power the vehicle. In order to reduce the amount of potentially environmentally harmful emissions due to the use of such vehicles, fuels such as hydrogen are being introduced as alternatives to the traditional petroleum-based fuels.

SUMMARY

One embodiment relates to a storage system for storing hydrogen and providing controlled release of hydrogen gas, comprising a closable container having an outer wall defining an interior, the interior configured to contain liquid lithium hydride, a portion of the outer wall comprising a thermally insulating layer; and a temperature control system configured to maintain the interior at a temperature such that the lithium hydride decomposes to produce hydrogen gas at a substantially equilibrium state.

Another embodiment relates to a power generation system, the system comprising a fuel storage system comprising a thermally insulated container defining an interior configured to contain liquid lithium hydride; and a temperature control system configured to selectively maintain the interior at a temperature such that the lithium hydride decomposes to produce hydrogen gas; and a combustion engine fluidly coupled to the fuel storage system and configured to receive hydrogen gas from the fuel storage system and use the hydrogen gas as fuel to generate power.

Another embodiment relates to a fuel cell system, comprising a fuel storage system comprising a thermally insulated container defining an interior configured to contain liquid lithium hydride; a temperature control system configured to selectively maintain the interior at a temperature such that the lithium hydride decomposes to produce hydrogen gas; and a fuel cell fluidly coupled to the fuel storage system and configured to receive hydrogen gas from the fuel storage system and use the hydrogen gas as fuel to produce electricity.

Another embodiment relates to a propulsion system for a vehicle, comprising a fuel storage system comprising a thermally insulated container defining an interior configured to contain liquid lithium hydride; a temperature control system configured to selectively maintain the interior at a temperature such that the lithium hydride decomposes to produce hydrogen gas; and a propulsion device fluidly coupled to the fuel storage system and configured to receive hydrogen gas from the fuel storage system and use the hydrogen gas as fuel to propel the vehicle.

Another embodiment relates to a method of storing hydrogen for use in a power generation system, comprising providing a storage container comprising an outer wall defining an interior; providing an amount of lithium hydride within the interior; heating the lithium hydride such that the lithium hydride decomposes to produce hydrogen gas; and selectively releasing the hydrogen gas from the interior for use in the propulsion system.

Another embodiment relates to a method of providing hydrogen gas for use in a propulsion system, the method comprising storing an amount of lithium hydride in an interior of a thermally insulated container; heating the interior of the container such that the lithium hydride decomposes to produce hydrogen gas; and directing the hydrogen gas to a propulsion system.

Another embodiment relates to an energy conversion system comprising a fuel system configured to store liquid lithium hydride and produce hydrogen gas; and a hydrogen gas powered energy conversion mechanism coupled to the fuel system and configured to receive hydrogen gas from the fuel system; wherein a portion of heat generated by the energy conversion mechanism is transferred back to the fuel system and to the lithium hydride.

Another embodiment relates to a storage system for storing hydrogen and providing controlled release of hydrogen gas, comprising a first container configured to contain liquid lithium hydride; a second container fluidly coupled to the first container and configured to receive liquid lithium hydride from the first container, the second container including an outlet port configured to enable removal of hydrogen gas from the second container; and a temperature control system configured to maintain the interior of the second container at a temperature such that the lithium hydride within the second container decomposes to produce the hydrogen gas.

Another embodiment relates to a method of storing hydrogen for use in an energy generation system, comprising storing an mount of lithium hydride within a first container; transferring a portion of the lithium hydride from the first container to a second container; heating the lithium hydride within the second container such that the lithium hydride within the second container decomposes to produce hydrogen gas; and selectively releasing the hydrogen gas from the second container.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION

DETAILED DESCRIPTION

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring to the figures generally, various embodiments disclosed herein relate to utilizing a hydrogen storage system in connection with a hydrogen-powered propulsion system and/or vehicle. By providing a "fuel tank" (i.e., a hydrogen storage system) containing lithium hydride (LiH), hydrogen gas can be provided to a number of propulsion systems, including, but not limited to, combustion engines such as automobile internal combustion engines, gas turbines, hydrogen fuel cells, electric motors, etc.

Generally, hydrogen gas is produced as a result of an equilibrium process where, in a first reaction (i.e., a forward reaction), lithium hydride (LiH) decomposes into lithium (Li) and hydrogen gas ($H_2$) due to the dissociation of lithium hydride molecules, and in a second reaction (i.e., a reverse reaction), hydrogen gas and lithium react to form lithium hydride. Symbolically, these reactions can be expressed as: $2LiH \leftrightarrow 2Li+H_2$. This process is typically carried out at relatively high temperatures, such as temperatures greater than 650 degrees Celsius. This process results in a mixture of lithium and lithium hydride (typically in a liquid state) and hydrogen gas. As the lithium hydride is heated, the production of hydrogen gas increases. In a sealed environment, the production of hydrogen gas would continue until a state of equilibrium is reached based on the amount of hydrogen gas and lithium present. By venting, or releasing, a portion of the hydrogen gas (e.g., as fuel for a vehicle propulsion system, etc.), the decomposition of the lithium hydride, and therefore the production of hydrogen gas, can be made to continue so long as sufficient temperatures are maintained.

To accommodate the high temperatures involved in storing hydrogen and producing hydrogen gas in this manner, various embodiments herein provide a thermally insulated storage container (e.g., a super-insulated tank, etc.) that provides a sufficient "thermal package" for storing the lithium hydride in a vehicle such as an automobile, train, aircraft, etc. Such thermal packaging enables utilizing lithium hydride at sufficiently high temperatures where the lithium hydride decomposes to produce hydrogen gas at relatively low pressures (e.g., at or around ambient pressure). A temperature control system may be used to maintain the lithium hydride at a controllable temperature corresponding to equilibrium gas pressures (e.g., between 1 Pa and 1 MPa).

Figure 1:
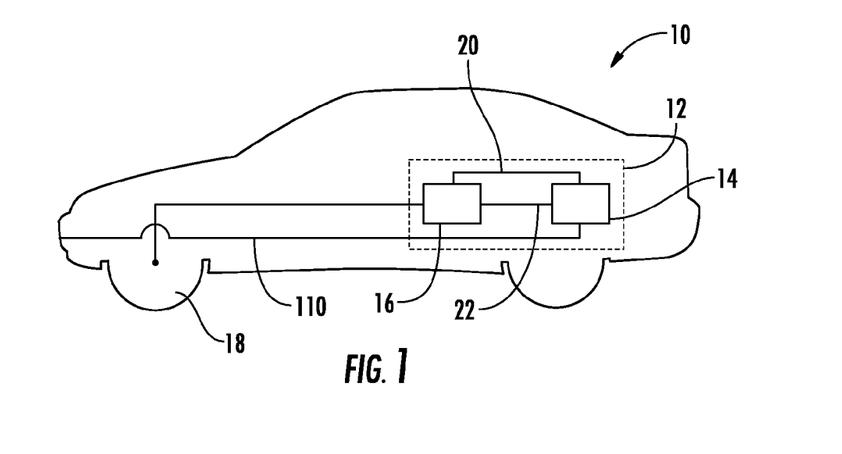
FIG. 1 is a schematic side view of a vehicle having a propulsion system according to one embodiment.

Referring now to FIG. 1, vehicle 10 is shown according to one embodiment. Vehicle 10 may include a wide variety of vehicles, including ground vehicles (e.g., wheeled vehicles, such as automobiles, trains, etc.), aircraft, etc. Vehicle 10 includes propulsion system 12 (e.g., a drive system, etc.) having fuel storage system 14 (e.g., a fuel tank or container, an insulated fuel storage system, etc.) and drive mechanism 16 (e.g., a propulsion device, etc.). During operation of vehicle 10, drive mechanism 16 receives fuel from fuel storage system 14 via fuel supply line 22, and propels vehicle 10 by way of, for example, wheels 18 (e.g., in the case of a wheeled vehicle). In some embodiments, as discussed in further detail below, at least a portion of the heat generated by drive mechanism 16 can be returned to fuel storage system 14 to, for example, facilitate maintaining the interior of a fuel storage container at a desired elevated temperature.

Figure 2:
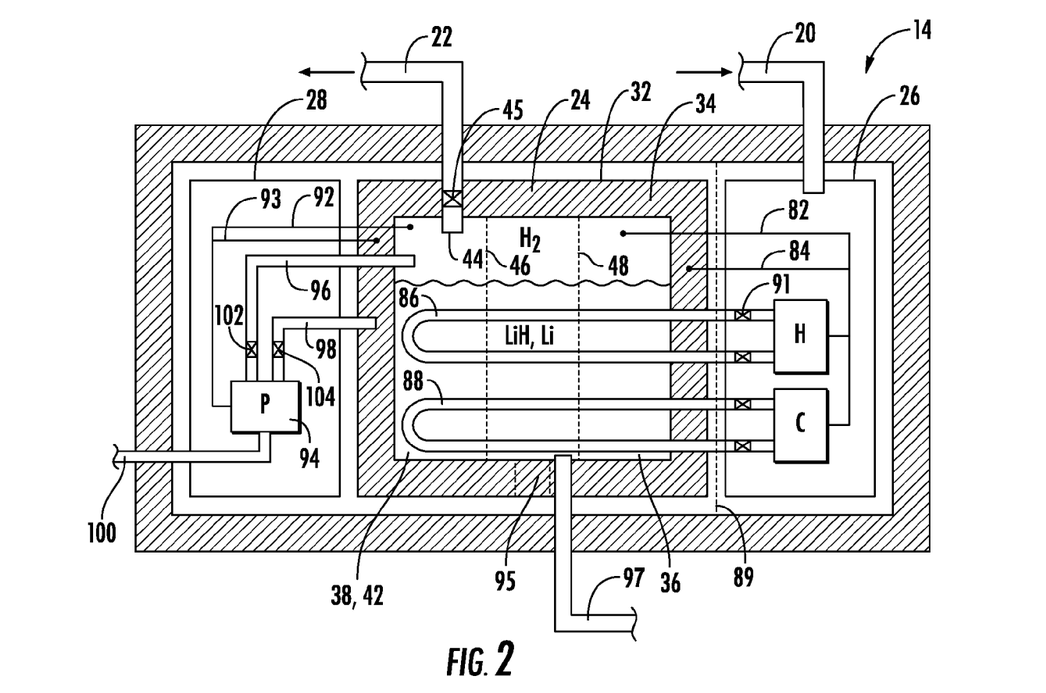
FIG. 2 is a schematic representation of a storage system usable with the propulsion system of FIG. 1 according to one embodiment.

Referring to FIG. 2, fuel storage system 14 is shown in greater detail according to one embodiment. It should be understood that while the term "fuel storage system" may be used, the various embodiments herein are equally applicable to storage systems generally. As shown in FIG. 2, storage system 14 includes container 24 (e.g., a tank, reservoir, etc.), temperature control system 26 (e.g., a heating and/or cooling system, etc.), pressure control system 28 (e.g., a vacuum system, a pressurization system, etc.), and energy dissipation system 30 (e.g., a "smart" energy dissipation system, an energy absorbing member, etc.). Temperature control system 26 and pressure control system 28 are operatively coupled to container 24 to control the temperature and pressure within the interior of container 24 and/or within the structure of container 24 itself (e.g., within one or more sidewalls of the container). Energy dissipation system 30 is configured to protect container 24 from undesirable impact forces, etc. that may result from, for example, an automobile accident or similar event.

According to one embodiment, container 24 includes one or more sidewalls 32 that form an outer wall and define interior 36. Sidewalls 32 can define any appropriate shape for container 24, including a cube, cylinder, or another suitable shape. Furthermore, the size of container 24 and the volume of interior 36 can be varied to suit a particular application or vehicle. At least a portion of sidewalls 32 of container 24 include insulating layer 34 (e.g., a thermally insulating layer or layers, etc.). As discussed in greater detail below, insulating layer 34 may include a variety of materials, including one or more vacuum layers, aerogels, combinations thereof, and/or other insulting layers or materials suitable for the high temperature applications disclosed herein.

Figure 5:
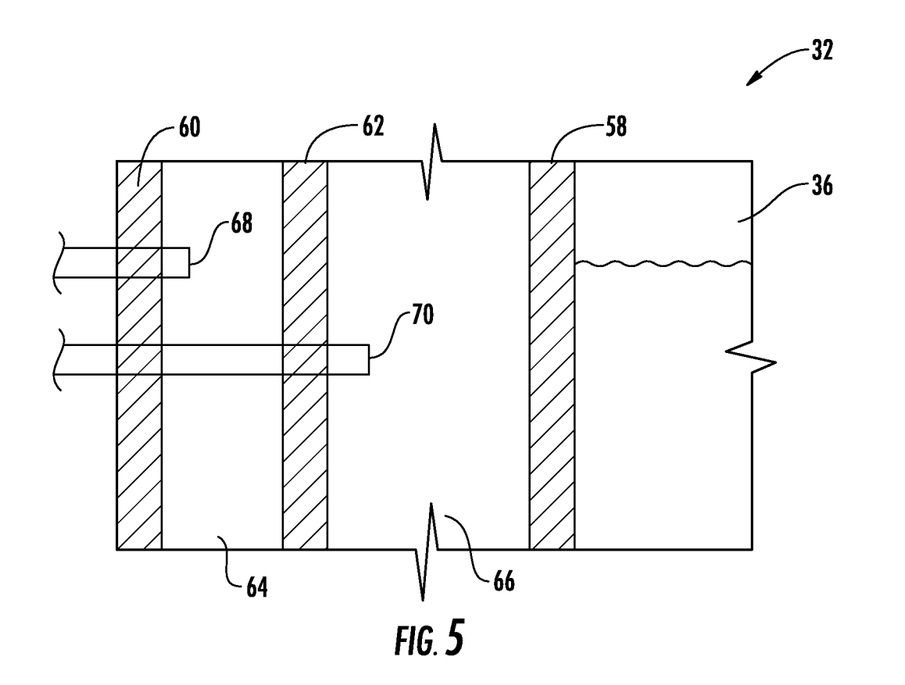
FIG. 5 is a cross-section view of a sidewall of a container according to one embodiment.

Referring to FIG. 5, a configuration of sidewall 32 is shown according to one embodiment as being a multi-walled, vacuum-insulated wall structure. As shown in FIG. 5, sidewall 32 includes inner wall 58, outer wall 60, and one or more middle or intermediate walls 62. Inner wall 58 is configured to face material (e.g., lithium hydride, lithium, hydrogen, etc.) contained within interior 36. Outer wall 60 is configured to provide an outer surface for container 24. Intermediate wall 62 divides the space between inner wall 58 and outer wall 60 into one or more intermediate spaces 64, 66.

Walls 58, 60, 62 can be made of any suitable material, including a variety of metals. In one embodiment, walls 58, 60, 62 are gas and liquid impermeable such that inner wall 58 can contain liquid and gas materials, and such that a vacuum environment can be generated within one or more of intermediate spaces 64, 66. Generating such a vacuum environment provides the thermally insulating properties necessary to contain a liquid such as lithium hydride at the necessary operating temperatures of 650 degrees Celsius or more.

In order to generate a vacuum environment within intermediate spaces 64, 66, one or more pressure ports 68, 70 can be provided that extend into intermediate spaces 64, 66. For example, as shown in FIG. 5, first pressure port 68 extends into intermediate space 64, and second pressure port 70 extends into intermediate space 66. First and second pressure ports 68, 70 form part of a fluid connection between intermediate spaces 64, 66 and pressure control system 28. As discussed in greater detail below, pressure control system 28 is operable to vary the vacuum levels within intermediate spaces 64, 66 to desired levels. Furthermore, pressure control system 28 may utilize fluid connections with intermediate spaces 64, 66 via pressure ports 68, 70 to "vent" intermediate spaces 64, 66, and enable heat to be released from intermediate spaces 64, 66, and therefore sidewall 32.

According to various alternative embodiments, the thicknesses of walls 58, 60, 62, and the shapes and/or sizes of intermediate spaces 64, 66 may be varied to suit a particular application. For example, in one embodiment, walls 58, 60, 62 and intermediate spaces 64, 66 are configured to enable safe use of container 24 to store liquid lithium hydride within a vehicle structure such as an automobile, aircraft, etc. In yet further embodiments, more or fewer intermediate spaces may be utilized relative to those shown in FIG. 5. For example, additional intermediate walls may be provided, or one or more of the intermediate spaces may be further divided into "sub-spaces."

Figure 6:
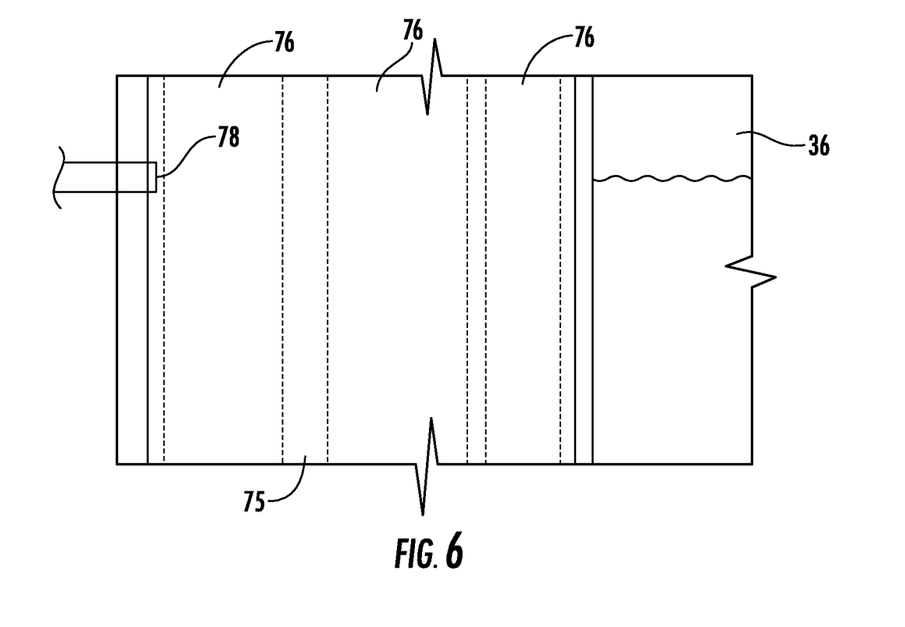
FIG. 6 is a cross-section view of a sidewall of a container according to another embodiment.

Referring to FIG. 6, a configuration of sidewall 32 is shown according to another embodiment as having multiple layers of insulative material. As shown in FIG. 6, sidewall 32 includes inner wall 72 and outer wall 74. Inner wall 72 is configured to face material (e.g., lithium hydride, lithium, hydrogen etc.) contained within interior 36 of container 24. Outer wall 74 is configured to provide an outer surface for container 24. Insulating layer 76 (e.g., a thermally insulating layer, insulating member, etc.) is provided within intermediate space 75 between inner wall 72 and outer wall 74.

As shown in FIG. 6, multiple insulating layers 76 can be provided within intermediate space 75 between inner wall 72 and outer wall 74. For example, in one embodiment, three insulating layers 76 can be provided between inner wall 72 and outer wall 74. In one embodiment, layers 76 can comprise MLI (multilayer insulation) designed to reduce thermal radiation transport between inner wall 72 and outer wall 74. The MLI can include a large number (e.g., 100 or more) layers 76. When using MLI insulation, intermediate space 75 can be evacuated, removing as much gas as possible, thereby reducing its effect on thermal conductivity. The individual layers 76 within the MLI insulation may not form a set of complete, gas-tight, enclosures, but instead may allow any residual gas within intermediate space 75 to travel between the layers, and hence permit it to be more readily removed from intermediate space 75. Layers 76 can be made up of loose material, such as a loose insulation, or alternatively, layers 76 can be made up of one or more discrete insulating structures. For example, according to one embodiment, insulating layer 76 can be or include one or more insulating sections that can be fitted between inner wall 72 and outer wall 74. In one embodiment, insulating layer 76 is a solid, low-density, porous material with relatively low thermal conductivity, such as an aerogel made of a silica or similar material. Aerogel structures provide relatively good thermal insulation because they are composed largely of gas (being a low density, porous material), which limits the conduction of heat (particularly if the aerogel is made of a material having a low thermal conductivity), and because they have an internal lattice structure that prevents significant air circulation, thereby inhibiting convective heat transfer.

Walls 72, 74 can be made of any suitable material, including a variety of metals. In one embodiment, walls 72, 74 are gas and liquid impermeable such that inner wall 72 can contain liquid and gas materials, and such that a low or high pressure environment can be generated within intermediate space 75. In order to control the pressure within intermediate spaces 75, pressure port 78 can extend through outer wall 74 and into intermediate space 75. Pressure port 78 provides fluid communication between intermediate space 75 and, for example, pressure control system 28. Pressure control system 28 is operable to vary the pressure level within intermediate space 75 to desired levels. Furthermore, pressure control system 28 may utilize fluid connections with intermediate space 75 via pressure port 78 to "vent" intermediate space 75, and enable heat to be released from intermediate space 75, and therefore sidewall 32. In some embodiments (e.g., when using MLI or aerogel insulation) intermediate space 75 may be evacuated and sealed, without post-evacuation use of pressure port 78. In some embodiments, a "getter" material may be placed within, or fluidly coupled to, intermediate space 75 to absorb any residual gas that might be introduced (e.g., by outgassing from walls 72, 74, or from insulating layers 75) after initial evacuation of gas from intermediate space 75.

According to various alternative embodiments, the thicknesses of walls 72, 74 and the shapes and/or sizes of intermediate space 75 may be varied to suit a particular application. For example, in one embodiment, walls 72, 74 and intermediate space 75 are configured to enable safe use of container 24 to store liquid lithium hydride within a vehicle structure such as an automobile, aircraft, etc. In yet further embodiments, more or fewer intermediate spaces may be utilized relative to those shown in FIG. 6. For example, one or more intermediate walls may be provided, or the intermediate space may be further divided into "sub-spaces."

According to some embodiments, sidewall 32 may include a combination of the features shown in FIGS. 5 and 6. For example, sidewall 32 may include walls such as inner and outer walls 58, 72 and 60, 74, and may include any combination of intermediate walls, such as intermediate wall 62 shown in FIG. 5, relatively open, intermediate spaces that are provided with a vacuum environment, such as intermediate spaces 64, 66 shown in FIG. 5, and/or intermediate spaces that are filled with an thermally insulating material, such as insulating layer 76 used in connection with intermediate space 75 shown in FIG. 6. Furthermore, various other materials, walls, insulating materials, etc. may be used instead of or in addition to those illustrated in FIGS. 5 and 6 according to various alternative embodiments. For example, additional insulating layers may be provided to the outside of outer walls 60, 74, additional thermally insulating material may be provided at various locations between the inner and outer walls, etc. All such features and combinations of features are to be understood to be within the scope of the present disclosure.

Referring back to FIG. 2, container 24 is configured to contain various materials that chemically react with each other in order to produce a gaseous fuel usable in various drive and/or propulsion systems or other devices. For example, in one embodiment, container 24 is configured to contain first material 38 (e.g., a metal hydride such as lithium hydride) that decomposes to produce second material 40 (e.g., a metal such as lithium, etc.) and third material 42 (e.g., a gas such as hydrogen gas, etc.). The reverse of this reaction may also occur within container 24 (e.g., such that hydrogen gas and lithium react to form lithium hydride). As such, materials 38, 40 may be in a liquid state within container 24 while material 42 is in a gaseous state within container 24. According to various alternative embodiments, other materials (e.g., other metal hydrides, metals, etc.) in other states (i.e., solid, liquid, gas) may be contained within container 24.

According to one embodiment, container 24 contains lithium hydride that decomposes into lithium and hydrogen gas. Port 44 provides fluid communication between interior 36 and supply line 22 (e.g., a fuel supply line, etc.) such that hydrogen gas can be directed from interior 36 to drive mechanism 16. In some embodiments, port 44 includes valve 45 that is operable to control the amount of hydrogen gas permitted to leave interior 36 of container 24. Port 44 and valve 45 may be made of any material (e.g., metal, etc.) suitable for fluid transportation of materials such as hydrogen gas. One or more outlets or ports 97 may further be provided and enable one or more of adding material (e.g., lithium hydride, hydrogen gas, etc.) or removing material (e.g., lithium, etc.) to/from interior 36.

According to one embodiment, sidewalls 32 define a generally unitary interior space without dividers, etc. According to an alternative embodiment, interior 36 is divided into separate interior spaces by one or more dividers 46, 48 (e.g., wall structures, dividing members, etc.), as shown in FIG. 2. While interior 36 is shown in FIG. 2 as being divided by dividers 46, 48 into three generally equally-sized rectangular interior spaces, in other embodiments interior 36 can be divided into more or fewer interior spaces, interior spaces having different shapes and/or sizes from those shown in FIG. 2, or interior spaces having different shapes and/or sizes from one another.

According to various alternative embodiments, interior 36 can be sized to suit a particular vehicle application. For example, container 24 may be used in connection with a drive system (e.g., either a hydrogen based internal combustion engine or a hydrogen fuel cell and electric motor). As such container 24 and interior 36 can be sized to provide a desired approximate driving range (e.g., 100 miles, 200 miles, etc.) based on the capacity of container 24. Similarly, in the case of aircraft or other vehicles, the size of container 24 and interior 36 can be varied to provide a desired travel capability prior to needing to refill/recharge container 24 with a renewed supply of lithium hydride and/or other materials.

Figure 3:
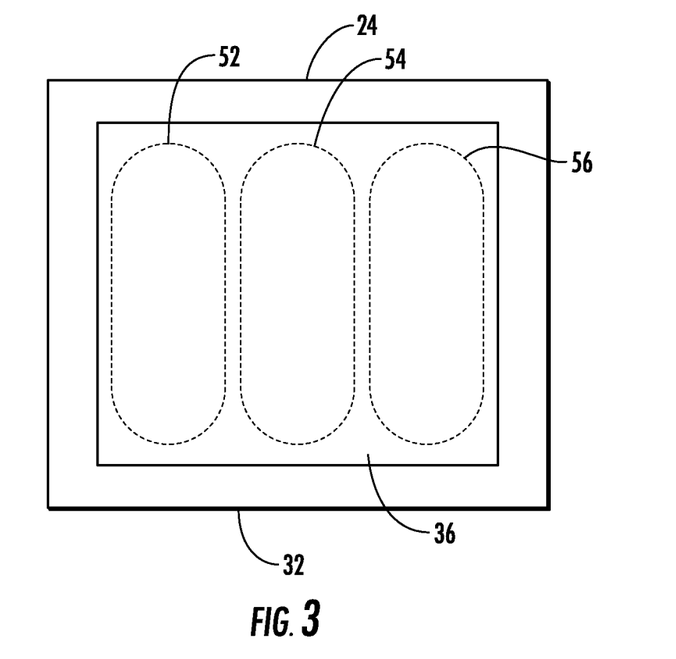
FIG. 3 is a schematic representation of a portion of a storage system according to another embodiment.

Referring to FIG. 3, according to one embodiment, one or more capsules (e.g., pellets, packages, etc.) shown as capsules 52, 54, 56 can be provided within interior 36 to contain at least a portion of a material such as lithium hydride. For example, capsules 52, 54, 56 can be configured such that the capsules retain liquid lithium hydride and lithium, but are at least partially permeable to hydrogen gas so as to permit the hydrogen gas produced within capsules 52, 54, 56 to escape from capsules 52, 54, 56 and be vented from interior 36 via port 44 as required, for example, for operation of a drive mechanism. Capsules 52, 54, 56 can be made of any suitable material capable of containing the lithium and/or lithium hydride and permitting release of hydrogen gas. Capsules 52, 54, 56 can alternatively be made to accommodate other metal hydrides according to various alternative embodiments.

Referring again to FIG. 2, temperature control system 26 is configured to monitor and control the temperature of interior 36 of container 24 and the material(s) contained therein (e.g., lithium hydride, lithium, hydrogen gas, etc.). As also discussed above, the process of lithium hydride decomposing to produce lithium and hydrogen gas requires relatively high operating temperatures (e.g., the temperature of interior 36 of container 24) typically of greater than 650 degrees Celsius. Temperature control system 26 is operable to maintain interior 36 at a desired temperature during, for example, operation of a vehicle such as an automobile, an aircraft, or other vehicle or device.

In order to monitor the temperatures of container 24 and interior 36, temperature control system 26 in one embodiment includes one or more temperature sensors. For example, as shown in FIG. 2, temperature control system 26 includes first temperature sensor 82 and second temperature sensor 84. First temperature sensor 82 is provided within interior 36 of container 24, and is configured to provide an indication of a temperature of interior 36 and/or the materials contained therein. Second temperature sensor 84 is provided on or within sidewall 32 and is configured to provide an indication of a temperature of one or more portions (e.g., an internal wall, an exterior wall, an insulating layer or portion, etc.) of sidewall 32. Based on receiving the sensed temperature of interior 36 from first temperature sensor 82 and the sensed temperature of one or more portions of sidewall 32 from second temperature sensor 84, temperature control system 26 determines whether additional heating or cooling is required to maintain interior 36 at a desired operating temperature.

According to one embodiment, temperature control system 26 includes one or more heating elements or heating members 86. As shown in FIG. 2, heating members 86 can extend into interior 36 of container 24 to deliver heat to interior 36 and material(s) stored therein, including, for example, lithium hydride, lithium, and/or hydrogen gas. For example, in one embodiment, heating member 86 can circulate a heated fluid that delivers heat to interior 36. Alternatively, heating member 86 can be a substantially solid member that is heated (e.g., resistively) to elevated temperatures and then releases heat to material within interior 36 (e.g., via conduction, convection, etc.). In some embodiments, multiple heating members 86 may be utilized.

Similarly, temperature control system 26 can include one or more cooling elements or cooling members 88. As shown in FIG. 2, cooling members 88 can extend into interior 36 of container 24 to absorb heat from interior 36 and material(s) stored therein, including, for example, lithium, lithium hydride, and/or hydrogen gas. For example, in one embodiment, cooling member 88 can circulate a cooled fluid that absorbs heat from interior 36. Alternatively, cooling member 88 can be a substantially solid member that is cooled to relatively lower temperatures and then absorbs heat from interior 36 (e.g., via conduction, convection, etc.). In some embodiments, multiple cooling members 88 may be utilized. As discussed in greater detail below, in some embodiments, cooling members 88 may form part of a passivation system for storage system 14 (e.g., to passivate lithium, lithium hydride, etc.). In further embodiments, temperature control system 26 is configured to activate vent portion 95 (see FIG. 2). Vent portion 95 includes a portion of the insulating material surrounding interior 36, such that by moving vent portion 95, heat transfer away from interior 36 can be controlled. Vent portion 95 can take any suitable size or shape, and multiple vent portions 95 can be utilized. In some embodiments, temperature control system 26 can cool interior 36 by controllably increasing the rate of heat transport through insulating layer 34. This can be done, for example, by moving insulation away from a portion of the wall thereby increasing the heat transport. In another example, gas can be introduced into interior 36, thereby increasing the rate of heat transport. Vent portion 95 can later be used to remove this gas to lower the heat transport rate again.

According to one embodiment, temperature control system 26 is configured to re-use, or recycle, at least a portion of the heat released by operation of a propulsion system or other device such as a combustion engine, fuel cell, or electric motor. For example, as shown in FIGS. 1-2, return line 20 (e.g., a waste heat conduit, etc.) can be configured so as to deliver at least a portion of heat produced by one or more portions of a propulsion system or other device back to temperature control system 26 and/or container 24 such that the "waste heat" is used to maintain the elevated temperatures within container 24. In one embodiment, return line 20 circulates a fluid that carries heat between the propulsion or other device and temperature control system 26 and/or container 24. Other methods may be used to recycle waste heat according to various alternative embodiments.

In one embodiment, temperature control system 26 is configured such that all or a portion of temperature control system can be thermally de-coupled from (e.g., substantially insulated from, etc.) all or a portion of container 24 and/or interior 36 during periods when production of hydrogen gas is not required (e.g., during periods of non-use of a vehicle, etc.). For example, one or more components of temperature control system 26 positioned generally outside of container 24 can be configured to be moveable relative to and/or disconnected from one or more components of temperature control system 26 positioned generally inside of container 24 along, for example, joint or coupling portion 89. In some embodiments, a portion of an insulating material or layer such as insulating layer 76 may be configured to cover any apertures, etc. that may enable thermal leakage from container 24 upon disconnection of the components. In other embodiments, thermally decoupling a portion of temperature control system may comprises closing one or more valves 91 to prevent, for example, further transfer of heat via circulation of a heating/and or cooling fluid through container 24. Thermally decoupling all or a portion of temperature control system 26 may, among other things, limit heat loss from interior 36 during periods of non-use of a vehicle or other device that utilizes, for example, hydrogen gas produced within interior 36 of container 24.

According to a further embodiment, temperature control system 26 can include one or more passivation mechanisms configured to passivate one or more materials (e.g., lithium, lithium hydride, and/or hydrogen gas) within container 24 in the event of, for example, an automobile crash, an expected crash, etc., as a result of which damage to container 24 and/or other components of storage system 14 is likely. For example, one or both of heating member 86 and cooling member 88 can include a chemical delivery and/or releasing member configured to release a chemical (e.g., a "hydrogen getter" such as solid lithium, etc.), for example, within container 24, where the chemical is configured to react with/passivate one or more materials such as lithium, lithium hydride, hydrogen gas, etc. For example, the chemical may be chosen to minimize the oxidation rate of lithium, or lithium hydroxide if exposed to the atmosphere (e.g., by using carbon powder or liquid hydrocarbons to form lithium-carbon compounds). Further, cooling member 88 can deliver a coolant, such as water, to cool (e.g., quench, etc.) container 24 and/or any materials contained therein. In one embodiment, cooling member 88 can comprise pipes through which water is flowed, absorbing heat from the material within container 24 by boiling. The resultant vapor can then be vented to the atmosphere. Further, a quenching system can be configured to solidify all or a part of the lithium or lithium hydride. Other forms of passivation may be used according to various alternative embodiments.

Referring further to FIG. 2, pressure control system 28 is configured to monitor and control the pressure level with interior 36 and/or sidewall(s) 32 of container 24. In one embodiment, control of pressure within interior 36 can be used to control (via controlling the recombination rate of hydrogen with lithium) the equilibrium dissociation temperature of the lithium hydride. In order to monitor the pressures of container 24 and interior 36, pressure control system 28 in one embodiment includes one or more pressure sensors. For example, as shown in FIG. 2, pressure control system 28 includes first pressure sensor 92 and second pressure sensor 93. First pressure sensor 92 is provided within interior 36 of container 24, and is configured to provide an indication of a pressure of interior 36. Second pressure sensor 93 is provided within sidewall 32 and is configured to provide an indication of a pressure of one or more intermediate spaces (e.g., such as the intermediates spaces shown in FIGS. 5-6, etc.) of sidewall 32. Based on receiving the sensed pressure of interior 36 from first pressure sensor 92 and the sensed pressure of one or more portions of sidewall 32 from second pressure sensor 93, pressure control system 28 determines whether variations in pressure are required.

According to one embodiment, one or more pressure lines such as pressure lines 96, 98 extend from pump 94 into interior 36 and/or within sidewall 32. Pump 94 can be a pressure pump, so as to provide an increase in pressure in a desired region, and/or a vacuum pump, so as to provide a decrease in pressure in a desired region. Any suitable type pump may be used. As shown in FIG. 2, in one embodiment, pressure line 96 extends from pump 94 to interior 36, and pressure line 98 extends from pump 94 to one or more intermediate spaces of sidewall 32. In some embodiments, one or more of ports 68, 70, and 78 shown in FIGS. 5-6 may be fluidly coupled to pump 94 via pressure line 98. One or more valves 102, 104 can be provided in pressure lines 96, 98 to control the flow of air, etc. into and out of interior 36 and sidewall 32. Pump 94 is also fluidly coupled to an environment exterior to storage system 14 by way of vent line 100. Vent line 100 provides a means for drawing gas (e.g., air) from, and exhausting gas to, the exterior environment. For example, should pump 94 be used to generate a vacuum within an interior space within sidewall 32, gas pulled from the interior space can be exhausted from pump 94 to the exterior environment via vent line 100.

Figure 4:
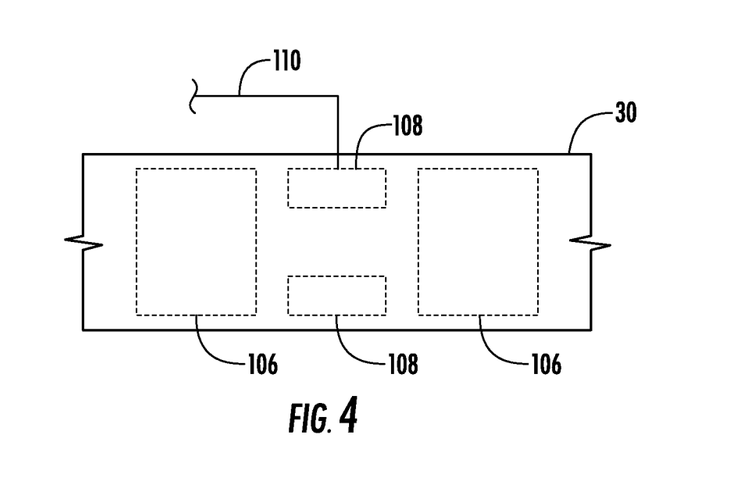
FIG. 4 is a schematic representation of a portion of an energy dissipation system according to one embodiment.

Referring now to FIGS. 2 and 4, energy dissipation system 30 is shown in greater detail according to an one embodiment. Energy dissipation system 30 is configured to surround all or a portion of container 24 and provide protection to container 24 from undesirable forces, etc. (e.g., in the event of an automobile crash, etc.). Energy dissipation system 30 includes one or more energy absorbing members 106, 108 that may be positioned at various locations adjacent to or around container 24. Energy absorbing members 106, 108 are intended to absorb energy that may damage or otherwise interfere with the operation of fuel storage system 14.

Energy absorbing members 106, 108 can be configured to absorb energy by deformation such that energy that would otherwise be transmitted to container 24 or other components of storage system 14 is instead used to deform the energy absorber. As such, the energy absorbing members may define one or more crumple zones, or crush spaces, having structures intended to deform in the case of an impact, etc. Alternatively, one or more of the energy absorbing members, such as energy absorbing member 108, may be a deployable (e.g., expandable, inflatable, etc.) energy absorber (e.g., similar to an air bag device, etc.) that is configured to expand, inflate, etc. upon receiving a control signal from control line 110. Control line 110 may form part of a vehicle safety system or other system intended to detect potential collisions, impacts, etc. as a result of sensing various parameters associated with a vehicle, such as accelerations, decelerations, etc.

In one embodiment, energy dissipation system 30 can surround all or a part of container 24, temperature control system 26, and/or pressure control system 28. Further, in some embodiments, all or a portion of energy dissipation system 30 can be positioned adjacent one or more portions of container 24. In yet further embodiments, all or a portion of energy dissipation system 30 can be integrated into container 24. For example, in one embodiment, energy dissipation system 30 can be at least partially integrated into sidewall 32 of container 24. Energy dissipation system 30 can in one embodiment be an aerogel material or other low density structure to provide both thermal insulating and energy absorbing properties.

Figure 7:
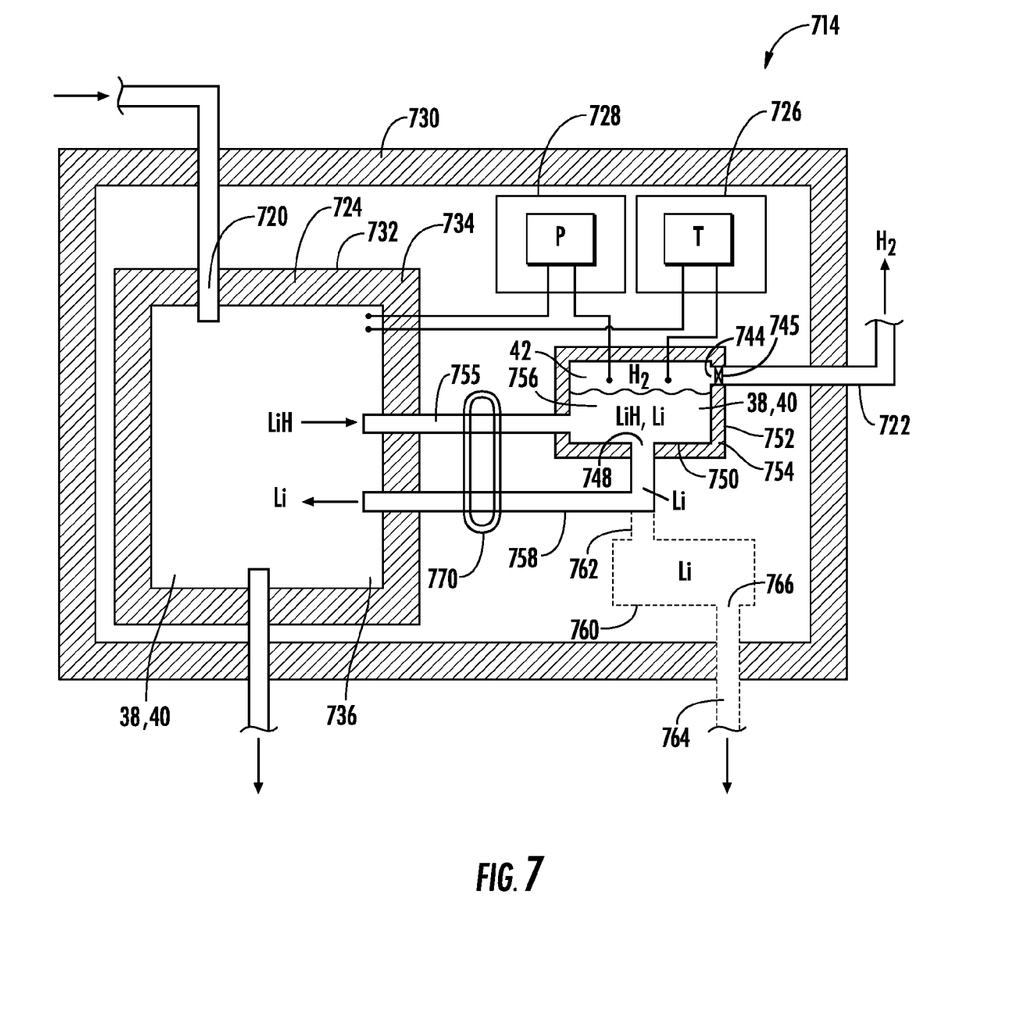
FIG. 7 is a schematic representation of a storage system usable with the propulsion system of FIG. 1 according to another embodiment.

Referring now to FIG. 7, fuel storage system 714 is shown according to one embodiment. As shown in FIG. 7, storage system 714 includes container 724 (e.g., a tank, reservoir, etc.), temperature control system 726 (e.g., a heating and/or cooling system, etc.), pressure control system 728 (e.g., a vacuum system, a pressurization system, etc.), energy dissipation system 730 (e.g., a "smart" energy dissipation system, an energy absorbing member, etc.), decomposition chamber 750, and may include optional storage chamber 760. Temperature control system 726 and pressure control system 728 are operatively coupled to container 724 and decomposition chamber 750 to control the temperature and pressure within the interior of container 724 and decomposition chamber 750 and/or within the structure of container 724 or decomposition chamber 750 itself (e.g., within one or more sidewalls of the container or the decomposition chamber). Energy dissipation system 730 is configured to protect container 24 and decomposition chamber 750 from undesirable impact forces, etc. that may result from, for example, an automobile accident or similar event, and can include any of the features discussed with respect to energy dissipation system 30.

According to one embodiment, container 724 includes one or more sidewalls 732 that form an outer wall and define interior 736. Sidewalls 732 can define any appropriate shape for container 724, including a cube, cylinder, or another suitable shape. Furthermore, the size of container 724 and the volume of interior 736 can be varied to suit a particular application or vehicle. Decomposition chamber 750 is in fluid communication with container 724. In one embodiment, a passage 755 (e.g., pipe, conduit, etc.) extends between container 724 and decomposition chamber 750. Passage 755 may include pumps, gates or valves to control the movement of material between container 724 and decomposition chamber 750. In some embodiments, the material in container 724 (e.g. lithium hydride) is a liquid. In some embodiments, the material in container 724 (e.g., lithium hydride) is a solid (e.g., chunks or pellets) and passage 755 may be or include a gravity feed, a conveyor belt, etc. for transport of the solid. In some embodiments, the material in container 724 is a slurry (e.g., pellets of lithium hydride in a liquid lithium carrier fluid) and both components are transported via passage 755 into decomposition chamber 750. Decomposition chamber 750 includes one or more sidewalls 752 that form an outer wall and define interior 756. Sidewalls 752 can define any appropriate shape for chamber 750 including a cube, cylinder, or another suitable shape. In one embodiment, decomposition chamber 750 may be configured as a continuation of passage 755 with a cross-section that is substantially similar to passage 755. At least a portion of sidewalls 732 and/or sidewalls 752 can include insulating layer 734 or 754 (e.g., a thermally insulating layer or layers, etc.). Insulating layer 734 and 754 may include a variety of materials, including one or more vacuum layers, aerogels, combinations thereof, and/or other insulting layers or materials suitable for the high temperature applications disclosed herein.

Container 724 and decomposition chamber 750 are configured to contain various materials that chemically react with each other in order to produce a gaseous fuel usable in various drive and/or propulsion systems or other devices (e.g., stationary devices, etc.). Container 724 provides a reservoir to hold the bulk of the material (e.g., lithium hydride). A portion of this material is then transferred to and transformed in decomposition chamber 750 to produce the gaseous fuel (e.g., hydrogen gas). The use of decomposition chamber 750 allows the amount of gaseous fuel produced to be controlled independent of the conditions and properties (e.g., temperature, pressure, volume etc.) of chamber 724. For example, in one embodiment, container 724 is configured to contain first material 38 (e.g., a metal hydride such as lithium hydride). First material 38 is transported (e.g., pumped) from container 724 to decomposition chamber 750, in which first material 38 decomposes to produce second material 40 (e.g., a liquid metal such as lithium, etc.) and third material 42 (e.g., a gas such as hydrogen gas, etc.). The reverse of this reaction may also occur within decomposition chamber 750 (e.g., such that hydrogen gas and lithium react to form lithium hydride). As such, materials 38, 40 may be in a liquid state within decomposition chamber 750 while material 42 is in a gaseous state within decomposition chamber 750. According to various alternative embodiments, other materials (e.g., other metal hydrides, metals, etc.) in other states (i.e., solid, liquid, gas) may be contained within container 724 or decomposition chamber 750. Furthermore, while in some embodiments container 724 and decomposition chamber 750 are separated and fluidly coupled by one or more passages, in other embodiments, container 724 and chamber 750 can be adjacent one another and share one or more sidewalls, insulting layers, etc.

According to one embodiment, decomposition chamber 750 contains lithium hydride that decomposes into lithium and hydrogen gas. Port 744 provides fluid communication between interior 756 of decomposition chamber 750 and supply line 722 (e.g., a fuel supply line, etc.) such that hydrogen gas can be directed from interior 756 to a drive system, propulsion system, or other device. In some embodiments, port 744 includes valve 745 operable to control the amount of hydrogen gas permitted to leave interior 756 of decomposition chamber 750. Port 744 and valve 745 may be made of any material (e.g., metal, etc.) suitable for fluid transportation of materials such as hydrogen gas.

According to one embodiment, lithium remaining after the decomposition of lithium hydride is transported from decomposition chamber 750. Port 748 provides fluid communication between interior 756 of decomposition chamber 750 and container 724 via return passage 758. In some embodiments, port 748 includes a valve to control the flow of material through port 748. Lithium or a mixture of lithium and lithium hydride can be directed to container 724 through return passage 758 to mix with the material contained therein.

According to an alternative embodiment, port 748 may provide fluid communication between interior 756 of decomposition chamber 750 and storage chamber 760 via passage 762. As such, lithium may be collected in storage chamber 760 instead of being returned to container 724. Lithium may be emptied from storage chamber 760 through outlet line 764 via port 766. In some embodiments, port 766 includes a valve to control the flow of lithium from storage chamber 760. In some embodiments, fuel storage system 714 may include both passage 758 between decomposition chamber 750 and container 724 and passage 762 between decomposition chamber 750 and storage chamber 760. A valve may be provided to direct material from interior 756 of decomposition chamber 750 either back to container 724 or to storage chamber 760.

According to various alternative embodiments, interiors 736 and 756 can be sized to suit a particular vehicle or other non-vehicle application. For example, container 724 may be used in connection with a drive system (e.g., either a hydrogen based internal combustion engine or a hydrogen fuel cell and electric motor). As such container 724 and interior 736 can be sized to provide a desired approximate driving range (e.g., 100 miles, 200 miles, etc.) based on the capacity of container 724. Similarly, decomposition chamber 750 and interior 756 may be configured to allow for a desired rate of production of the gaseous fuel. Further, in the case of aircraft or other vehicles, the size of container 724 and interior 736, and of decomposition chamber 750 and interior 756, can be varied to provide a desired travel capability prior to needing to refill/recharge container 724 with a renewed supply of lithium hydride and/or other materials (e.g., hydrogen gas, etc.).

Temperature control system 726 is configured to monitor and control the temperature of interior 736 of container 724, interior 756 of decomposition chamber 750, and the material(s) contained therein (e.g., lithium hydride, lithium, hydrogen gas, etc.). As also discussed above, the process of lithium hydride decomposing to produce lithium and hydrogen gas requires relatively high operating temperatures (e.g., the temperature of interior 756 of decomposition chamber 750) of greater than 650 degrees Celsius. Temperature control system 726 is operable to maintain interior 756 at a desired temperature during, for example, operation of a vehicle such as an automobile, an aircraft, or other vehicle or device. Temperature control system 726 may be further configured to maintain interior 736 at a temperature at which the material (e.g., lithium hydride) remains stable and does not decompose. Temperature control system 726 may include a variety of temperature sensors provided in various locations in fuel storage system 714, such as within sidewall 732, interior 736, sidewall 752, and/or interior 756. Temperature control system 726 determines whether additional heating or cooling is required to maintain interior 736 and interior 756 at a desired operating temperature. Temperature control system 726 may include one or more heating elements or heating members, and one or more cooling elements or cooling members extending into interior 736 or interior 756. Temperature control system 726 may actively control the thermal conductivity of insulating layer 734 or 754. For example, temperature control system 726 may include any of the features of temperature control system 26, including heating members 86 and/or cooling members 88.

In one embodiment, fuel storage system 714 includes a heat recycling system, shown as heat exchanger loop 770. Heat exchanger loop 770 (e.g., a counter-flow heat exchanger) is configured to re-use, or recycle, at least a portion of the heat absorbed by the material (e.g., lithium or lithium hydride) in decomposition chamber 750 before it returns to container 724 or is delivered to storage chamber 760. Heat exchanger loop 770 transfers the heat from the material in return passage 758 or passage 762 to the material in passage 755 to pre-heat the material before it reaches decomposition chamber 750.

Other methods may be used to recycle waste heat according to various alternative embodiments. According to one embodiment, temperature control system 726 is configured to re-use, or recycle, at least a portion of the heat released by operation of a propulsion system or other device such as a combustion engine, fuel cell, or electric motor. For example fuel storage system 714 may include a return line 720 (e.g., a waste heat conduit, etc.) that is configured to deliver at least a portion of heat produced by one or more portions of a propulsion system or other device back to temperature control system 726 and/or decomposition chamber 750 such that the "waste heat" is used to maintain the elevated temperatures within decomposition chamber 750.

Figure 8:
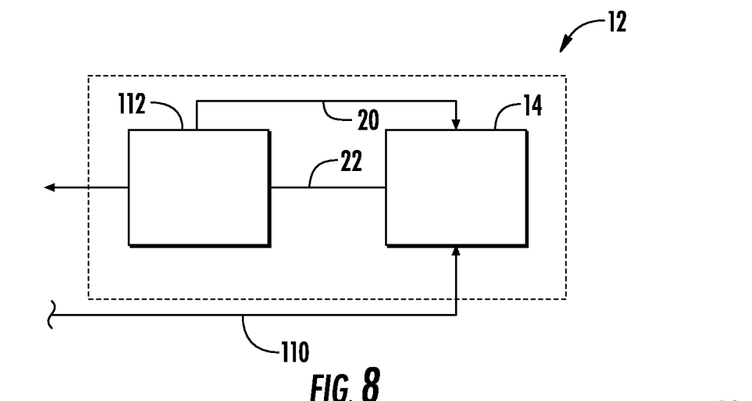
FIG. 8 is a schematic representation of a propulsion system according to one embodiment.

Referring now to FIG. 8, a configuration of propulsion system 12 is shown according to one embodiment. As shown in FIG. 8, propulsion system 12 includes fuel storage system 14 coupled to combustion engine 112 via fuel line 22. Storage system 14, as discussed above, is configured to provide a supply of hydrogen gas to combustion engine 112. Combustion engine 112 can be an internal combustion engine such as an automobile internal combustion engine, a gas turbine (e.g., for use in aircraft or other applications), or any other type of combustion engine adapted to use the gaseous fuel (e.g., hydrogen gas) provided by storage system 14.

Referring further to FIG. 8, in some embodiments return line 20 is configured to transfer at least a portion of the heat generated by operation of combustion engine 112 back to storage system 14 to, for example, assist in maintaining the required elevated temperatures within container 24. Furthermore, control line 110 can provide control signals to storage system 14, and more specifically, energy dissipation system 30, so as to deploy one or more energy absorbing members such as energy absorbing members 108 shown in FIG. 4.

Figure 9:
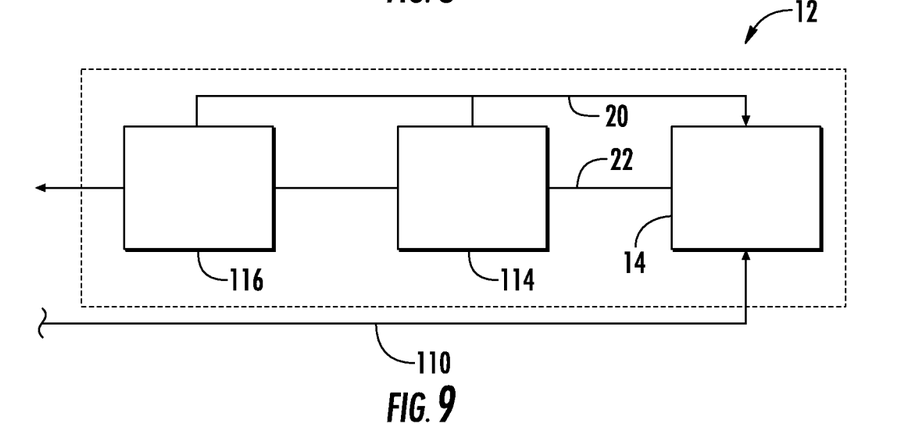
FIG. 9 is a schematic representation of a propulsion system according to another embodiment.

Referring now to FIG. 9, a configuration of propulsion system 12 is shown according to another embodiment. As shown in FIG. 9, propulsion system 12 includes fuel storage system 14 coupled to fuel cell 114 via fuel line 22. Storage system 14, as discussed above, is configured to provide a supply of hydrogen gas to fuel cell 114. Fuel cell 114 is in turn coupled to electric motor 116. In operation, fuel cell 114 uses hydrogen gas supplied by storage system 14 to generate electricity, which is provided to electric motor 116. Electric motor 116 can be used to power an automobile or other vehicles, or be used in a variety of non-vehicle applications.

Referring further to FIG. 9, in some embodiments return line 20 is configured to transfer at least a portion of the heat generated by operation of fuel cell 114 and/or electric motor 116 back to storage system 14 to, for example, assist in maintaining the required elevated temperatures within container 24. Furthermore, control line 110 can provide control signals to storage system 14, and more specifically, energy dissipation system 30, so as to deploy one or more energy absorbing members such as energy absorbing members 108 shown in FIG. 4.

Figure 11:
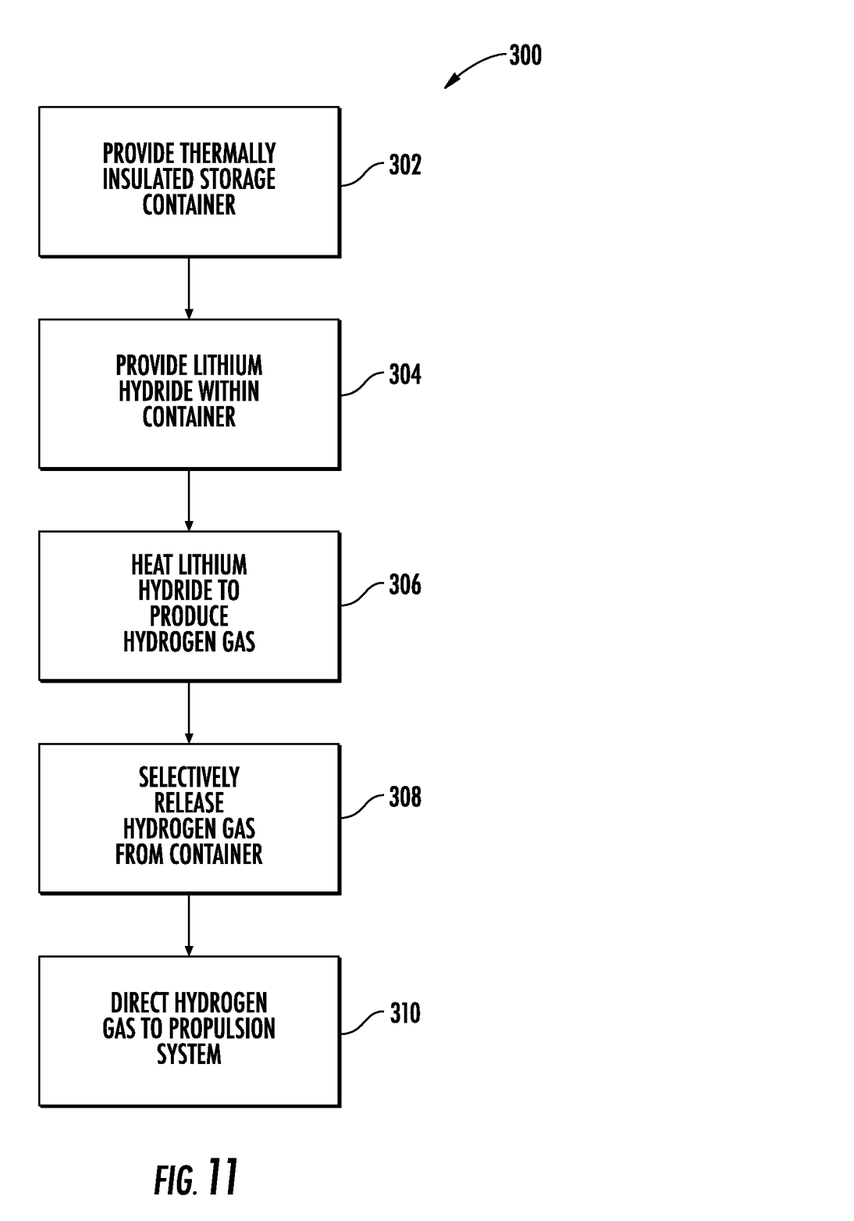
FIG. 11 is a block diagram illustrating a method of storing hydrogen and producing hydrogen gas according to one embodiment.

Referring now to FIG. 11, a method 300 of storing hydrogen and producing hydrogen gas is illustrated according to one embodiment. At 302, a thermally insulated storage container is provided. The thermally insulated storage container may include any of the features of the storage containers discussed herein. Lithium hydride is provided within the container (304), and heated to produce hydrogen gas (306). As discussed above, because of the relatively high temperatures required to use lithium hydride for the storage of hydrogen and the production of hydrogen gas, the thermally insulated container can include various temperature and pressure control features intended to enable safe use of the storage container in vehicle propulsion and other applications. The produced hydrogen gas is selectively released from the container (308). In some embodiments, the hydrogen gas is directed to a propulsion system (310), such as a vehicle propulsion system.

Figure 12:
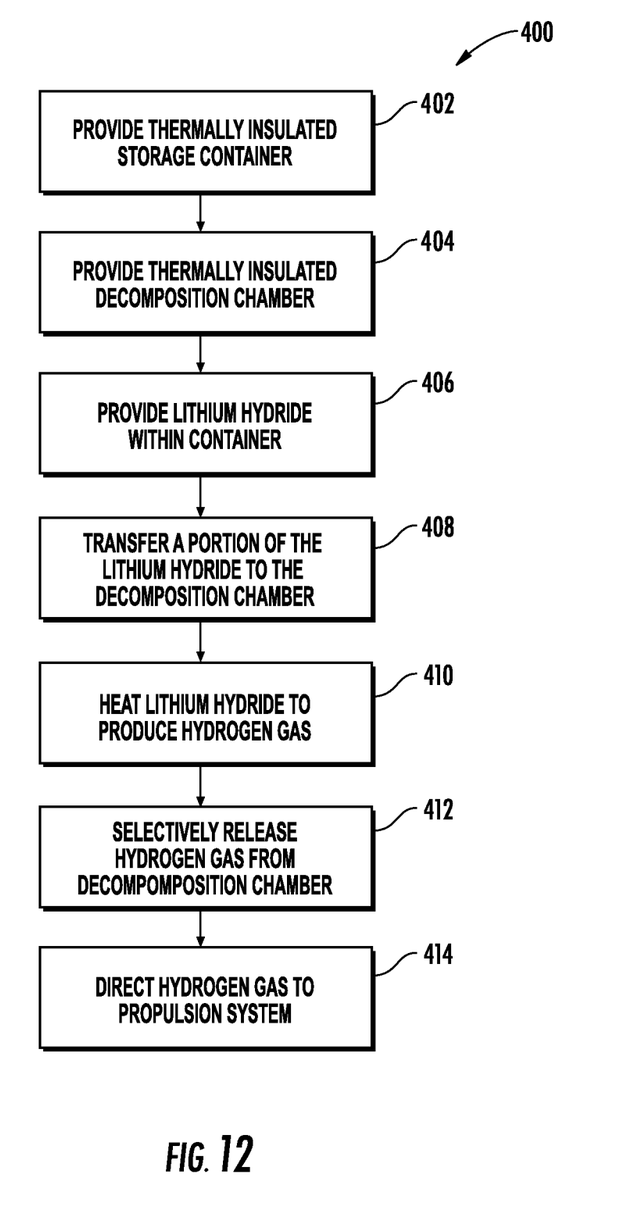
FIG. 12 is a block diagram illustrating a method of storing hydrogen and producing hydrogen gas according to another embodiment.

Referring now to FIG. 12, a method 400 of storing hydrogen and producing hydrogen gas is illustrated according to one embodiment. At 402, a thermally insulated storage container is provided. The thermally insulated storage container may include any of the features of the storage containers discussed herein. A thermally insulated decomposition chamber in fluid communication with the storage container is provided (404). Lithium hydride is provided within the container (406). A portion of the lithium hydride is transferred to the decomposition chamber (408) and is subsequently heated to produce hydrogen gas (410). As discussed above, because of the relatively high temperatures required to use lithium hydride for the storage of hydrogen and the production of hydrogen gas, the thermally insulated decomposition chamber can include various temperature and pressure control features intended to enable safe use of the decomposition chamber in vehicle propulsion and other applications. The produced hydrogen gas is selectively released from the decomposition chamber (412). In some embodiments, the hydrogen gas is directed to a propulsion system (414), such as a vehicle propulsion system.

Figure 10:
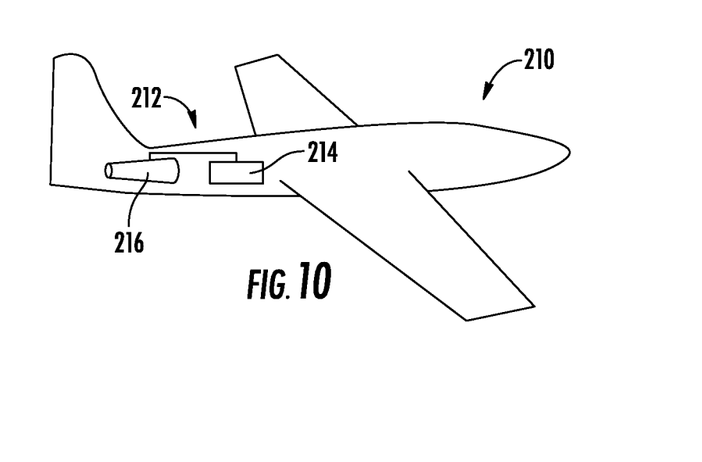
FIG. 10 is a schematic perspective view of a vehicle having a propulsion system according to another embodiment.

While FIG. 1 shows propulsion system 12 being used in connection with an automobile, it should be understood that according to various other embodiments, propulsion system 12 and/or storage system 14 may be used in connection with various other vehicles, and/or in other non-vehicle applications. For example, as shown in FIG. 10, propulsion system 212 sharing all or some of the features of propulsion system 12 is shown used with aircraft 210. Propulsion system 212 includes storage system 214 that provides fuel (e.g., hydrogen gas) to propulsion device, shown as gas turbine 216. Other applications for propulsion systems 12, 212 and storage systems 14, 214 are possible according to various other embodiments.

The various propulsion and storage systems disclosed herein may provide various advantages over more traditional systems. For example, some conventional storage systems for hydrogen rely on compressing hydrogen gas, which requires significantly greater storage pressures. The storage system disclosed herein can typically operate at pressures at or near ambient pressure. Furthermore, the use of hydrogen in a propulsion system is often more environmentally friendly than the use of other fuels, such as gasoline.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A storage system for storing hydrogen and providing controlled release of hydrogen gas, comprising:
   a closable container having an outer wall defining an interior for receiving liquid lithium hydride, a portion of the outer wall comprising a thermally insulating layer;
   a temperature control system, wherein the temperature control system is programmed to maintain the interior at a temperature sufficient for the lithium hydride to decompose to produce hydrogen gas at a substantially equilibrium state; and
   an outlet port for removal of the hydrogen gas.

2. The system of claim 1, wherein the thermally insulating layer comprises multiple layers having a vacuum environment provided between adjacent layers.

3. The system of claim 1, wherein the thermally insulating layer comprises an aerogel.

4. The system of claim 1, further comprising a plurality of encapsulating members for encapsulating the liquid lithium hydride, a portion of each of the plurality of encapsulating members being permeable to the hydrogen gas at the temperature.

5. The system of claim 1, wherein a portion of the temperature control system is moveable between a thermally conductive relationship with the liquid lithium hydride and a thermally insulated relationship with the liquid lithium hydride.

6. The system of claim 1, wherein the temperature control system comprises a passivation system for passivating at least one selected from the group consisting of the liquid lithium hydride, the hydrogen gas, and liquid lithium produced during production of the hydrogen gas.

7. The system of claim 1, further comprising a cooling port fluidly connecting an interior of the container with an exterior environment.

8. The system of claim 7, wherein the cooling port enables the release of heat from the interior of the container with an external environment.

9. The system of claim 1, further comprising an energy dissipation system coupled to the container.

10. The system of claim 9, wherein the energy dissipation system receives an input from a vehicle safety system and activates an energy dissipation member in response to receiving the input.

11. The system of claim 1, wherein the interior is capable of containing liquid lithium.

12. The system of claim 11, wherein the interior comprises a first compartment for containing liquid lithium hydride and a second compartment for containing liquid lithium.

13. A power generation system, the system comprising:
a fuel storage system comprising:
a thermally insulated container defining an interior for containing liquid lithium hydride; and
a temperature control system, wherein the temperature control system is programmed to selectively maintain the interior at a temperature sufficient for the lithium hydride to decompose to produce hydrogen gas; and
a combustion engine fluidly coupled to the fuel storage system for receiving hydrogen gas from the fuel storage system and using the hydrogen gas as fuel to generate power.

14. The system of claim 13, wherein the container comprises a sidewall having a thermally insulating layer.

15. The system of claim 14, wherein the thermally insulating layer comprises an aerogel.

16. The system of claim 14, wherein the sidewall defines a plurality of interior spaces for containing the liquid lithium hydride.

17. The system of claim 14, further comprising a port extending through the sidewall and being in fluid communication with the interior to enable controlled release of the produced hydrogen gas from the interior.

18. The system of claim 13, further comprising a plurality of encapsulating members for encapsulating the liquid lithium hydride, a portion of each of the plurality of encapsulating members being permeable to the hydrogen gas.

19. The system of claim 13, wherein a portion of the temperature control system is moveable between a thermally conductive relationship with the liquid lithium hydride and a thermally insulated relationship with the liquid lithium hydride.

20. The system of claim 13, wherein the temperature control system comprises a passivation system for passivating the liquid lithium hydride.

21. The system of claim 20, wherein the passivation system comprises a chemical releasing member for releasing a chemical to react with the lithium hydride.

22. The system of claim 20, wherein the passivation system comprises a cooling member extending into the interior for cooling the lithium hydride.

23. The system of claim 13, further comprising a pressure control system, wherein the pressure control system comprises a pressure sensor for monitoring a pressure within the interior.

24. The system of claim 23, wherein the pressure control system varies the pressure within the interior based upon sensing the pressure within the interior.

25. A fuel cell system, comprising:
a fuel storage system comprising:
a thermally insulated container defining an interior for containing liquid lithium hydride;
a temperature control system, wherein the temperature control system is programmed to selectively maintain the interior at a temperature sufficient for the lithium hydride to decompose to produce hydrogen gas; and
a fuel cell fluidly coupled to the fuel storage system for receiving hydrogen gas from the fuel storage system and using the hydrogen gas as fuel to produce electricity.

26. The system of claim 25, wherein the container comprises a sidewall having a thermally insulating layer.

27. The system of claim 26, further comprising a port extending through the sidewall and being in fluid communication with the interior to enable controlled release of the produced hydrogen gas from the interior.

28. The system of claim 27, further comprising a controllable valve for controlling flow of the hydrogen gas through the port.

29. The system of claim 28, wherein the valve is responsive to hydrogen demand from the fuel cell.

30. The system of claim 25, further comprising a plurality of encapsulating members for encapsulating the liquid lithium hydride, at least a portion of each of the plurality of encapsulating members being permeable to the hydrogen gas.

31. The system of claim 25, wherein a portion of the temperature control system is moveable between a thermally conductive relationship with the liquid lithium hydride and a thermally insulated relationship with the liquid lithium hydride.

32. The system of claim 25, wherein the temperature control system comprises a passivation system for passivating the liquid lithium hydride.

33. The system of claim 26, wherein the thermally insulating layer comprises multiple layers having a vacuum environment between layers.

34. The system of claim 25, further comprising a pressure control system, wherein the pressure control system comprises a pressure sensor for monitoring a pressure within the interior.

35. The system of claim 34, wherein the pressure control system varies the pressure within the interior based upon sensing the pressure within the interior.

* * * * *